United States Patent [19]
Le Boudec et al.

[11] Patent Number: 6,016,306
[45] Date of Patent: Jan. 18, 2000

[54] ROUTING BANDWIDTH-RESERVED CONNECTIONS IN INFORMATION NETWORKS

[75] Inventors: Jean-Yves Le Boudec, Jouxtens-Mezery, Switzerland; Antoni B. Przygienda, Bethesda, Md.; Robert Sultan, Katonah, N.Y.

[73] Assignee: International Business Machines Corporation, Armonk, N.Y.

[21] Appl. No.: 08/666,377

[22] PCT Filed: Dec. 24, 1993

[86] PCT No.: PCT/EP93/03683

§ 371 Date: Sep. 12, 1996

§ 102(e) Date: Sep. 12, 1996

[87] PCT Pub. No.: WO95/18498

PCT Pub. Date: Jul. 6, 1995

[51] Int. Cl.[7] .............................. G06F 13/00; H04L 12/56
[52] U.S. Cl. ...................... 370/235; 370/400; 395/200.71
[58] Field of Search .................... 370/248, 252, 370/254, 255, 256, 235, 238, 351, 389, 400, 408, 401; 395/200.71, 200.72, 200.79, 200.73

[56] References Cited

U.S. PATENT DOCUMENTS

| | | | |
|---|---|---|---|
| 5,088,032 | 2/1992 | Bosack | 395/200.72 |
| 5,115,495 | 5/1992 | Tsuchiya et al. | 395/200.69 |
| 5,163,042 | 11/1992 | Ochiai | 370/238 |
| 5,218,676 | 6/1993 | Ben-Ayed et al. | 395/200.7 |
| 5,521,910 | 5/1996 | Matthews | 370/256 |
| 5,596,719 | 1/1997 | Ramakrishnan et al. | 395/200.71 |
| 5,596,722 | 1/1997 | Rahnema | 395/200.71 |
| 5,600,794 | 2/1997 | Callon | 370/351 |
| 5,606,669 | 2/1997 | Bertin et al. | 370/200.53 |
| 5,608,721 | 3/1997 | Natarajan et al. | 370/238 |

Primary Examiner—Douglas W. Olms
Assistant Examiner—Seema S. Rao
Attorney, Agent, or Firm—Gerald R. Woods

[57] ABSTRACT

This invention defines a routing method which allows a determination of best paths from link weights in situations where these weights are not additive, but the characteristic of a concatenated path is determined mainly by single "bottleneck" links. To be compatible, the metric must be chosen from a specific set of metrics, called bottleneck metrics in this description. The new widest-path method has some characteristics in common with the known Dijkstra method for additive weights. Implementations in communication networks are disclosed which lead to new nodes, new networks and new network protocols.

4 Claims, 3 Drawing Sheets

ROUTING BANDWIDTH-RESERVED CONNECTIONS IN INFORMATION NETWORKS

TECHNICAL FIELD

The present invention concerns the routing function in information networks, e.g. switch-based computer networks. In such a network it is necessary to determine paths from source nodes to destination nodes. This invention enhances and expands the known Dijkstra routing method to support additional types of service, e.g. reserved bandwidth service, which are not possible with the Dijkstra method. The invented method will also be called "widest-path method" throughout this description. A specific path metric is used, called "bottleneck metric" in the sequel, which was found to be compatible with the algebraic rules that govern the routing method. With this metric, it is possible to reflect realistically enough at least the bandwidth characteristics of the paths, but other characteristics may also be represented. The widest-path method can be used e.g. in connection-oriented networks as Asynchronous Transmission Mode (ATM) or Internet Stream Protocol Version II (ST.II) networks, where the routing decisions are made at connection setup, but it is not limited thereto. It can be used to precompute paths from any source to any destination and prestore all paths until a respective one is used for a connection request. Such precomputed routing trees are advantageous in source routing methods, where the local source node tree is used to produce a source vector, which describes the path as a sequence of nodes to be covered during packet transmission. The present invention is especially useful in link-state routing mechanisms for networks, but it could be used in the context of any routing problem for which the widest-path method is applicable and for which the bottleneck metric is an appropriate representation of the respective path characteristic.

BACKGROUND OF THE INVENTION

Link-state algorithms such as Open Shortest Path First (OSPF) are in common use for providing the routing function in computer networks implementing a connectionless network layer. In such cases, the network routing algorithm builds routing tables as a background task. Information about links is maintained and updated by a topology function replicated in all nodes; as a result, every node owns an image of the network, see e.g. EP 0 348 327 or EP 0 447 725. This image is used with a shortest-path algorithm to compute routes to all destinations. The routing tables, produced by the routing algorithm, normally are used to forward individual packets. With the traditional metrics, optimal paths are "shortest" paths. They are obtained by using the conventional Dijkstra method with a path "length" given by the sum of the "lengths" of the separate links contributing to the path. In such a setting, the "length" of a link is most often not its true geometrical length, but can be a value representing any characteristic of that link. In the following, "weight" will be used as the general term for such values. It could represent e.g. monetary costs for the use of that link, and one goal of the routing algorithm would be to minimize the cost of the network, while maintaining proper connectivity. It could also represent delays on that link, the goal would be to minimize the delays in network data flow. A few examples of metrics in connection with bandwidth or occupancy characteristics can be found in EP 0 276 754 and in U.S. Pat. No. 4,905,233. In EP 0 276 754, a link weight approximately proportional to the occupied capacity is described and used in the Dijkstra method.

A metric that reflects the allocatable capacity available on links is also known from U.S. Pat. Nos. 5,088,032 and 5,067,127. In U.S. Pat. No. 5,067,127, a congestion avoidance control method for communication networks is described, which uses a link weight inversely proportional to the available bandwidth and the path weight is the sum of the link weights. In U.S. Pat. No. 5,088,032 a modified Ford path computation algorithm is described. There, the weight of a link can be inversely proportional to the available bandwidth, and the path weight is determined as the maximum of the weights of its links. Whereas it is stated there that other methods of finding the route with minimum metric may also be used, it is not clear at all that any other method is compatible with the metric proposed. A distance vector method is described; the Dijkstra method is not mentioned at all. As said above, the traditional Dijkstra method uses a path weight, which is determined as the sum of the weights of its links, and therefore it is no substitute for the modified Ford algorithm. Further and in contrast to the distance vector method, the widest-path method (as the Dijkstra method) builds a complete spanning tree of paths from a source to all destinations using a topology database of all nodes, their directly attached links and related link weights. This is especially useful in link-state routing mechanisms and source routing.

In virtual circuit networks, routing is connection-oriented and the routing decision is made at connection setup. If, in addition, connections must have guaranteed bandwidth, e.g. for loss-sensitive communication, a virtual circuit network with bandwidth reservation is necessary. Examples are networks of ST.II routers and ATM networks. There, all packets or cells belonging to a connection follow the same path. In such cases, the routing algorithm applies to the routing of connection setup messages, this is also referred to "call routing".

It is a general object of this invention to avoid the different drawbacks of the prior art and to extend and modify the Dijkstra routing method in a way which allows a determination from the weights of the bottleneck link or links of each path, of the "best" path, which is defined to include the "widest" bottleneck, that is the link with the most favorable (smallest or biggest) weight. It is another object to provide a link-state routing method, especially for virtual circuit networks, with guaranteed bandwidth or bandwidth reservation or with other characteristics which necessitate a bottleneck metric. A further object is to improve a network node by implementing in it a routing function enhancement comprising the widest-path method; improvements to the topology function are proposed to include in its update method a modified dampening method and/or a bandwidth encoding method to enable consideration of dynamically varying available bandwidths. Further disclosed is a network comprising improved nodes which may be mixed with normal nodes not supporting the devised enhancement.

SUMMARY OF THE INVENTION

The above objects are accomplished by enhancing and extending the Dijkstra routing method by applying an appropriate metric to determine link weights and path weights. An appropriate metric must reflect at least approximately the characteristics of the paths to be taken into account in the routing method and it must be compatible with this method. As was found, the bottleneck metrics comply with these constraints. They include metrics which are defined so that the weight of a path is given by the maximum of the weights of its links, and a link or path with smaller weight is the better link or path, respectively. In this case, with the widest-path method, the best paths are still paths with minimal weight in this case, as with the Dijkstra method. A formal description of such an example of the method in algorithm form is given in the appendix. There, a case is selected where the operation of link weight summation in the Dijkstra method is always replaced by a maximum operation which has the maximum of the link weights as its result. This definition means that the weight of a concatenated path is now the maximum of the weights of its links instead of the sum. It is possible to formally prove that the algebraic rules which govern the method hold for both operations. The beauty of the widest-path method is that it is easy to implement and can replace the Dijkstra method, where appropriate, without complications. Clearly, the bottleneck metrics include other metrics, too. As examples, the minimum (or another extremum) of the component link weights (or their absolute values) can be used to determine the path weight directly or after further calculation, provided that the calculation applied is a non-decreasing function. The median of component link weights or the component link weight closest to a predetermined target value can be used, if these reflect the path characteristic to be described. As a rule, an operation on the weights of the component links of a path is applied to select at least one link (the "bottleneck link") of the path, and the path's weight is then determined from the weights of its bottleneck links.

In the context of communication network routing, the metric reflects the allocatable capacity available on links and the widest-path method is used for the computation of the path with the highest allocatable capacity. In link-state routing, network nodes share link state information that reflects the available bandwidth on each of the links of the network. This is performed by encoding the available capacities as link weights and using a known distribution mechanism, called "topology function", for transmission. As the available capacity varies very dynamically, it is necessary to prevent excessive amounts of link state updates. This is known as "dampening" and an appropriate dampening method is described. The routing function can be applied to connection setup requests instead of individual packets. The widest-path method computes paths from any source to any destination, using the information obtained from the topology function. The paths can be stored and used to route connection requests as they arrive. One feature of the "widest-path" definition is that either a connection setup can be routed along a widest path, no matter how much bandwidth it requests, or it cannot be routed at all in the network. In other words, the method guarantees that the connection will find a path with sufficient bandwidth, assuming there exists such capacity in the network at all, and assuming the information provided by the topology function is up-to-date. This also means that one single computation can serve all possible bandwidth requests. One benefit of the widest-path method is that it is compatible with and allows the reuse of the well-tested routing function code. An additional benefit is that the routes produced by the method are computed and stored in advance of connection requests, thus supporting fast connection setup. In addition, the method can be used in conjunction with a routing protocol such as OSPF to work with standard network nodes that do not support the widest-path method. This way, mixed networks including enhanced and standard network nodes become possible. The method does not limit the number of hops. This is insignificant in many applications, but the limitation can be changed if necessary.

BRIEF DESCRIPTION OF THE DRAWINGS

An embodiment of the invention is described in detail below with reference to the drawings. To show more clearly the general inventive concept, a specific implementation in a communication network node is assumed. Additional inventive features in this context are also disclosed.

DETAILED DESCRIPTION OF AN EMBODIMENT ACCORDING TO THE INVENTION

A path is the concatenation of links, also called "component links" of the path, between network nodes. The width Cpath of a path is defined as the minimum of the available capacity on each of the component links. The available capacity is the bandwidth, in bits per second, that can be allocated to user connections. Therefore, the capacity bottleneck link determines what capacity is available on a path. A "widest path" is a path that, among all paths between one source and one destination, has the largest width.

Figure 1:
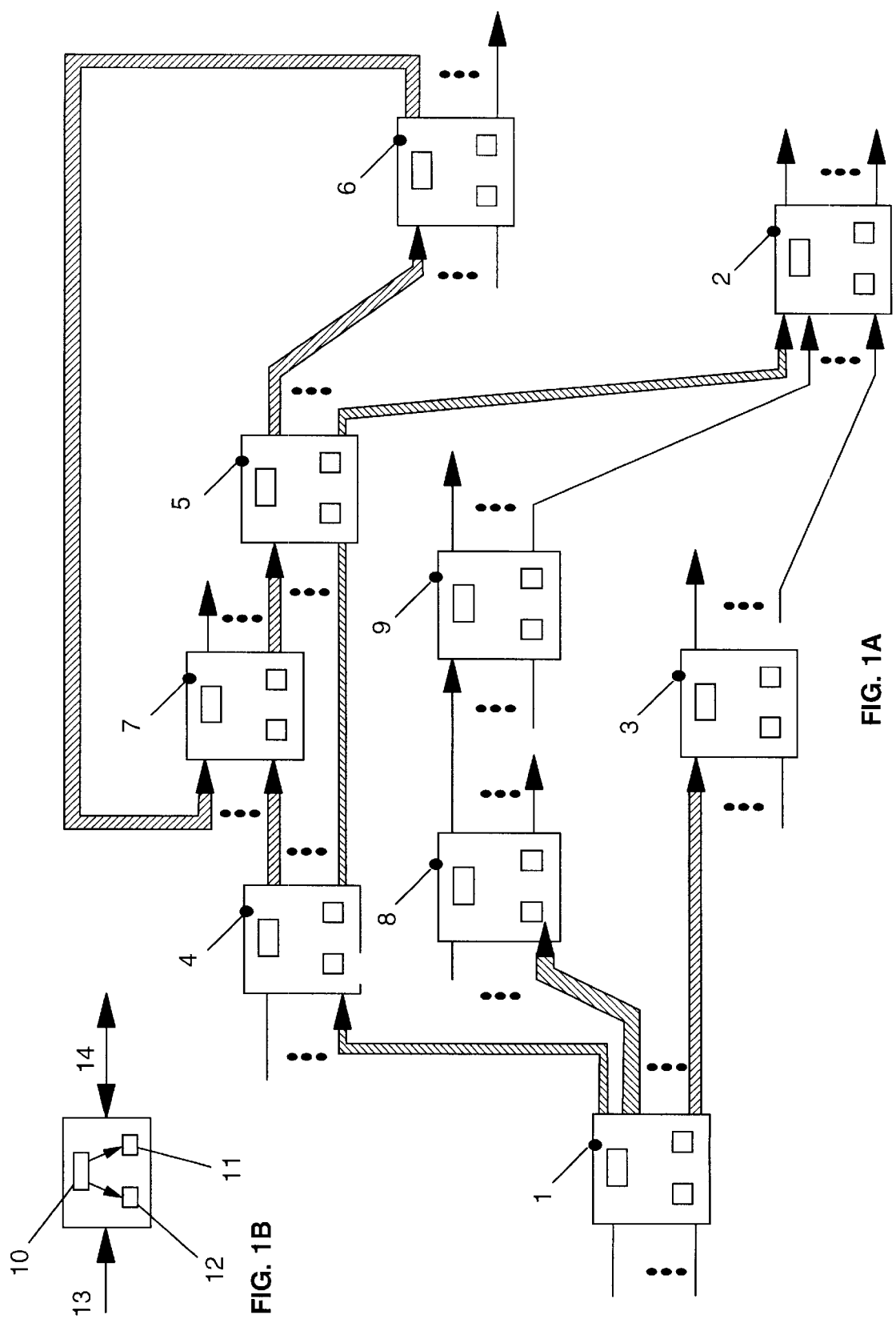
FIG. 1A illustrates schematically the widest-path method according to the invention. A typical routing problem with a bandwidth bottleneck situation in a network domain is assumed to explain this method in contrast to the state of the art.
FIG. 1B shows in more detail a node of the domain of FIG. 1A and the related information flow.

FIG. 1 illustrates a widest-path example in a domain including nodes 1 to 7 of an arbitrarily meshed network. Links of different available bandwidths are shown and the respective bandwidth is depicted by the width of the link connecting line. As is shown, a widest path from node 1 to 2 is the path 1-4-5-2, with an assumed width of say 40 Mb/s, determined by link 5-2. Whereas link 1-3 (100 Mb/s) is broader than 1-4 (60 Mb/s), path 1-3-2 is narrower than 1-4-5-2. It has a width of only 20 Mb/s, say, due to the bottleneck link 3-2. Weights are applied to the links in such a way that a link with smaller weight is wider (has more available bandwidth) than a link with bigger weight. Then, the widest link is a link with smallest weight and the narrowest link is a link with biggest weight. As an example, the weight Wlink of a link is defined as $$Wlink = Cmax - Clink,$$

where Cmax is a constant assumed to be larger than any link capacity (say Cmax=16 Gb/s). Clink is the available capacity, or bandwidth of the link.

Clearly, the conventional Dijkstra method would prefer path 1-3-2 of weight D132=W13+W32=2Cmax−120 Mb/s, and also path 1-8-9-2 (150 Mb/s, 20 Mb/s, 20 Mb/s) of weight D1892=3Cmax−190 Mb/s, over the true widest path 1-4-5-2 of weight D1452=3Cmax−150 Mb/s (assume 50 Mb/s for link 4-5). In the widest-path metric, the weight of a path is defined as the maximum of the weights of its component links, that is, it is determined by its narrowest link. Thus, $$Wpath = Max(Wcomponent\text{-}link) = Cmax - Min(Ccomponent\text{-}link) = Cmax - Cpath$$

With this bottleneck-type metric, in this context also called widest-path metric, the widest path is again a path with smallest weight, as with the Dijkstra method, but the widest-path method prefers path 1-4-5-2 of weight W1452=

Cmax−40 Mb/s over paths 1-3-2 and 1-8-9-2 of weights W132=Cmax−20 Mb/s=W1892.

The reason for defining the weights as complements to Cmax is the compatibility with the shortest path method used in network domains that do not use the widest-path method. As stated in Summary of the Invention, above, other link weights can be used for a bottleneck metric, e.g. to reflect other characteristics of the links or to ease calculations or encoding of link-state information. Examples are Wlink=K/Clink, see Background of the Invention, above, and the exponential encoding described below.

By nature, the widest-path method builds a tree of paths (as the Dijkstra method), so the resulting graph is always loop-free. There may exist paths, e.g. 1-4-5-6-7-5-2 that are optimal in the sense of the widest-path metric, but contain loops. Such paths are excluded automatically by the widest-path method. The quality of the paths can be further improved by adding to the method the constraint that, among all widest paths, only the ones with the least number of hops or, more precisely, number of link state advertisements used are retained. This defines a precedence of equal-weight routes. In the example, path 1-4-5-2 precedes path 1-4-7-5-2 of equal weight which is determined by bottleneck link 5-2 in both cases.

To make the method work in a link-state, connection-oriented routing environment, the nodes of the network need new capabilities. FIG. 1B shows a network node according to the invention including a known topology function 10. A widest-path generator 12 is connected to the topology function 10. Upon connection requests 13 from a network user, the widest path is assigned to route the connection. Further, link-state update information 14 is exchanged between network nodes to keep the topology function up to date. A bandwidth information update module 11 is connected to the topology function to include bandwidth information in the link-state update information 14 for variable available link capacity. Module 11 is comprising an encoder to format a bandwidth information to be sent out by the node, a receiver for receiving and, if necessary, decoding bandwidth information of other nodes, and a dampening mechanism avoiding immediate updating reaction to small bandwidth changes.

Figure 3:
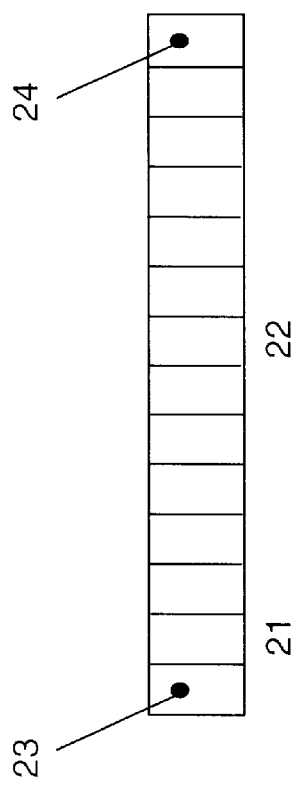
FIG. 3 shows an exponential bandwidth encoding format for link-state update information.

Module 11 encodes the available bandwidth Clink on a link as a 16-bit weight, see FIG. 3. This format is used for compatibility reason with existing link-state algorithms. An exponential notation is used in order to cover a range from 1 bit/s to Cmax=16 Gb/s. The encoding uses 8 as the exponentiation basis, 3 bits of exponent 21 starting from the most significant bit 23, and 13 bits of mantissa 22, ending with the least significant bit 24. There may be several ways to encode a specific capacity Clink. Among all encodings (exp, mant) for one capacity Clink, only the one with the smallest exponent is declared valid. This rule allows to put away with decoding capacities before manipulating them, because the usual comparisons on "long integers" apply. Namely, if c, c' are the 16-bit encodings of link capacities C, C', then $$C<C' <=> c<c' <=> W>W'.$$

Changing available bandwidth of a link with immediate bandwidth updating of all nodes, which is similar to changing its weight, can lead to disastrous scenarios, such as storms of link-state updates propagating through the network during a period of very frequent connection setups. This can lead to congestion, excess transient loops and similar problems often encountered in situations of overcorrections. To avoid this, a dampening method was defined which only invokes link-state updates for a link when a significant change appears, e.g. when an amount of its bandwidth has been reserved which is larger than a certain dampening threshold. For example, five connections for a fraction of Mbits/s each on a link of several Gbits/s occurring in a second would lead to five times distributing a change of not even 0.1% of the link's capacity, and probably to recomputation of the topology through all nodes. This is clearly unacceptable. The dampening method is based on the fraction of link bandwidth reserved. To achieve this goal, a threshold MaxDBandwidth must be provided that during the change of the dynamic link weight decides whether the new link advertisement should be started or not. Because of this requirement, every link must, beside the bandwidth weight field, contain a cumulated, not flushed, change in weight called delta-bandwidth. Every connection setup or release changes the delta-bandwidth and checks whether it exceeds the threshold. If it does, new topology update is propagated. One problem still remains, namely the "opaqueness" of the delta-bandwidth cost to all nodes. When the bandwidth of a link has been changed and "absorbed" by the delta-bandwidth field, it can potentially not be advertised for a long period of time. A possible routing mismatch during this period of time could happen, although this is rather unlikely, because the threshold should be so small that not distributing the delta should be negligible for routing. Nevertheless, a periodic timer for each node link is introduced, which is started whenever delta-bandwidth is changed from 0 to a value not equal to 0 and reset each time delta-bandwidth is set to 0. When the timer expires, it flushes delta-bandwidth if necessary. The dampening constant of 5% of the available link bandwidth is based on the behavior of a typical scenario assumed with either uniform or exponential size distribution of the requests arriving at a constant rate with a maximum size of 10% of the link bandwidth.

Figure 2:
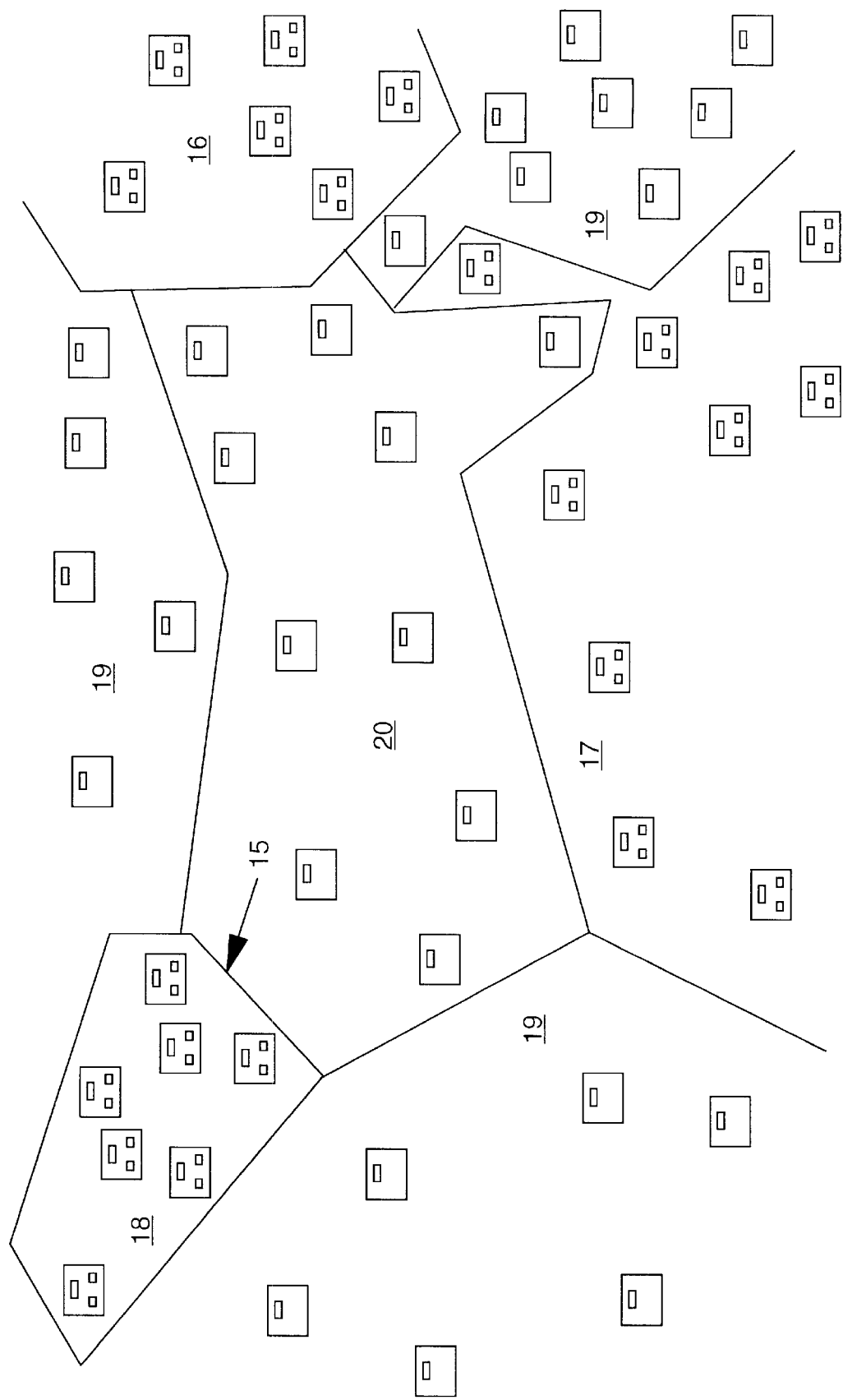
FIG. 2 depicts a mixed network of widest-path areas and standard areas.

Most of the up-to-date link-state routing protocols offer the capability of dividing the routing domain into subdomains. A topology information is summarized at the boundaries of the subdomains and only the summary is distributed. Certain constraints have nevertheless to be met to guarantee the non-ambiguity of the distributed information. The method of widest-path areas is proposed which allows intermixing of subdomains understanding widest-path and standard metrics with those only understanding standard metrics. An example of such a mixed network is depicted in FIG. 2. Three widest-path areas 16,17,18 of different topologies are shown imbedded in a network with areas 19,20 of standard nodes. On boundaries 15 of two subdomains with different characteristics, the unsupported metrics are simply dropped. This allows a gradual introduction of the widest-path method in routing domains. Here, the necessary changes for a OSPF standard routing protocol are described to get so called WET-OSPF, but other mixed networks are possible. WET denotes the three option bit names W, E, and T, of which only W is related to the widest-path area method. E and T are not relevant here.

In this context, network nodes are called "routers". Widest-path areas consist only of routers supporting the widest-path method. This is determined by a similar mechanism as the one used to have all routers in a stub area agree about the stub property. A new option bit is introduced, called W-bit. Routers of a widest-path area set this bit sending so-called hello-packets on area interfaces and refuse to build adjacency to routers in the area that do not have this bit set. Interfaces of widest-path routers connecting to a standard area will not have this bit set in the hello-packets, but only in the options field of the link advertisement for summary links, so that distribution of bandwidth metrics over the border of two widest-path areas will work. Moreover, a new time constant WET-MinLSInterval is introduced, beside the MinLSInterval of OSPF. The MinLS-Interval is used on the area interfaces of a router, the WET-MinLSInterval on the WET-area interfaces. Inside the area, the router link advertisement is distributed using WET-MinLSInterval. The method has the advantage that these advertisements will not be distributed into the next area, only summary link advertisements will. The summary link advertisements are installed in intervals equal to or larger than MinLSInterval. Nevertheless, this does not influence the router link advertisement, which can be installed as fast as WET-MinLSInterval allows, because all routers inside the area are using this interval on such interfaces.

Figure 4:
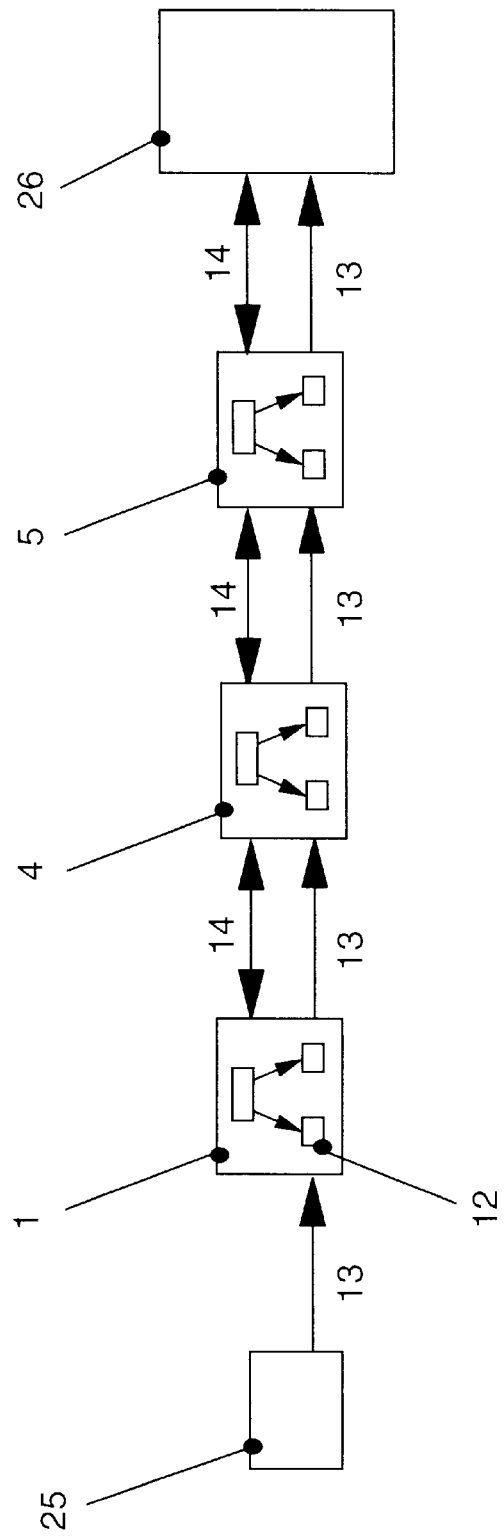
FIG. 4 illustrates call routing and the related information flow.

As a result of the widest-path method, every node in the network produces a local routing tree. This information can be used for call routing in a number of ways. One particularly attractive method is to use source routing, as mentioned above. An example of a call routing method used for setting up calls is illustrated in FIG. 4. A connection setup request 13 is sent from a source 25 to route a connection to destination 26. The local, pre-computed routing tree from a widest-path generator 12 at the source node 1 is used to produce a source vector, describing the path as a sequence of nodes 1,4,5 to be visited. Intermediate nodes 4,5 do not use the local routing tree, but instead consult the routing vector carried by every packet or connection setup message 13. This guarantees loop free routing of the call setup, since the widest-path method according to the invention always builds a loop free graph. Link-state update information 14 is exchanged between the nodes 1,4,5 as necessary.

The method presented here provides a means for computing paths. As should be clear from the foregoing detailed description, a routing method is described, which allows to determine the best path in a network from link weights in situations where these weights are not additive, but the weight of a path is defined by its bottleneck link. To be compatible with the method, the metric must be chosen from a specific set of metrics, called bottleneck metrics in this description. The new widest-path method has some characteristics of the well known Dijkstra method for additive weights.

Implementations in communication networks are described, which lead to new nodes, networks and related protocols, but the widest-path method can be used in many other routing problems, examples are given above. It can easily be seen that the widest-path method of the embodiment does not minimize the number of hops, only the availability of bandwidth is considered. The method as described is thus not directly adapted for wide area networks where bandwidth optimization is essential, but with some modifications it might be used for these applications, too. In contrast, it is attractive for local area networks due to its aforementioned benefits of compatibility with the Dijkstra method and as extension of OSPF, and because of its path precomputation capability. The method can be extended in many ways, depending on the application, without departing from the general inventive concept; it is envisioned to account for path quality, path security, or passenger comfort, to name a few applications. Various call setup schemes are possible, including multiparty calls; also, numerous modifications depending on intended network environment and types of nodes can be made in accordance with the general concept of the invention. All these different embodiments can be implemented by someone skilled in the art and thus fall within the scope of this invention.

APPENDIX

1. Formalism and Assumptions
uses ∃ operator to check for existence
Head(), Tail() return head or tail of a list, 0 if empty
Head + (e,q), Tail + (e,q) adds a element e to list q only if it is not yet in the list
Head − (q), Tail − (q) remove head, tail of list and returns removed value or 0 if list empty
Insert(e,k,q) inserts element e into list q at position k
MAX gives the maximum of its arguments
gives the number of elements in a list
[x] is the element at place x in a array or list or set
node 1 is the source
R is number of nodes
{} denotes a empty set or list
2. Algorithm

```
Node: ARRAY[1..R] OF
                SET Links OF STRUCTURE Link
                    BEGIN
                    INTEGER destination;
                    INTEGER cost;
                    END; /* topology database */
Spf : SET OF INTEGER; /* set of nodes on spf tree */
Route: ARRAY[1..R] OF
                LIST Hops OF STRUCTURE Element
                    BEGIN
                    INTEGER node;
                    INTEGER link_ndx;
                    END;
    /* set of node and link indices on the route from source to destination
*/
Cand: LIST OF INTEGER;
    /* indices of candidates to test next step sorted on distance */
INTEGER FUNCTION Length (rout: LIST OF STRUCTURE Element);
/* computes length of a route given as list of links */
BEGIN
    RETURN MAX_{j:=1}^{j<#rout}Node[rout.Element[j].node].Link[rout.Element
[j].
                            link_ndx].cost;
END; /* of function */
INTEGER c;
INTEGER i,j,k,dst,dist;
/* Topology Database already installed */
Route[ 1..R ]   :={};
Cand            :={};
SPF             :={};
c               :={}; /* index of the computed node, 1 is source */
WHILE c≠0 DO
    FOR i:=1 TO #Node[c].Links /* number of this node's links */
        dst := Node[Node[c].Links[i].destination];
        Head+(c, Spf);
        IF (∉ x Node[dst].Links[x].destination = c) AND dst ⊐ SPF
            /* checks whether a back link exists and destination not
               already computed on tree ?? */
            dist := MAX ( Node[c].Links[i].cost, Length(Route[c]));
            IF (dist < Length(Route[dst]) OR Length(Route[dst])=0)
                Route[dst]:= Route[c];
                Tail+(Element(c, i), Route[dst]);
                k:=1;
                WHILE k < #Cand AND Length(Route[k]) < dist
                    k:= k+1;
                END;
                Insert(dst, k, Cand ); /* insert sorted on candidate list */
            END;
        END;
    END;
    c= Head−( Cand );
END;
```

We claim:

1. For use at a node in a network having a plurality of nodes interconnected by links, each of the links having an assigned link weight reflecting a selected link characteristic, a method of selecting a least weight path from a source to a destination comprising the steps of:

constructing a set of loop-free paths from the source to the destination;

for each path in the set, determining the amount of currently-available bandwidth on each link in the path;

for each path in the set, assigning a path weight as a function of the minimum amount of bandwidth currently available anywhere along the path;

establishing a subset of paths including each path having a path weight equal to the lowest assigned path weight; and selecting a final path from the established subset of paths.

2. A method as set forth in claim 1 wherein the step of selecting a final path includes the following additional step where the subset includes more than one path:

selecting as the final path the path in the subset having the minimum number of links between source and destination.

3. A path selection apparatus for a node in a network having a plurality of nodes interconnected by links comprising:

a memory for storing the network topology, including the currently available bandwidth on each link in the network;

path generation logic for generating a set of possible paths between a source and a destination in the network;

path weighting logic for assigning a path weight to each generated path, the assigned path weight being a function of the lowest amount of currently available bandwidth over the generated path;

path selection logic for establishing a subset of paths including each path having a path weight equal to the lowest assigned path weight; and final selection logic for choosing a final path from the established subset of paths.

4. An apparatus as set forth in claim 3 wherein the final selection logic selects the path in the subset which has the minimum number of links between source and destination as the final path.

* * * * *